(12) United States Patent
Yamada (10) Patent No.: US 12,015,159 B2
(45) Date of Patent: Jun. 18, 2024

(54) METHOD OF PRODUCING FUEL CELL

(71) Applicant: HONDA MOTOR CO., LTD., Tokyo (JP)

(72) Inventor: Tadaaki Yamada, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 53 days.

(21) Appl. No.: 17/680,253

(22) Filed: Feb. 24, 2022

(65) Prior Publication Data

US 2022/0302466 A1 Sep. 22, 2022

(30) Foreign Application Priority Data

Mar. 17, 2021 (JP) .................................. 2021-043363

(51) Int. Cl.
*H01M 4/88* (2006.01)
*H01M 8/1004* (2016.01)

(52) U.S. Cl.
CPC ....... *H01M 4/8882* (2013.01); *H01M 8/1004* (2013.01)

(58) Field of Classification Search
CPC ............ H01M 4/8878; H01M 4/8882; H01M 4/8896; H01M 8/1004
See application file for complete search history.

(56) References Cited

U.S. PATENT DOCUMENTS 9,490,489 B2 11/2016 Ahn
11,081,714 B2 8/2021 Kosai et al.
2010/0129730 A1* 5/2010 Suzuki ............... H01M 4/8882 502/4
2013/0171529 A1 7/2013 Kato et al.
2014/0305596 A1* 10/2014 Ahn .................... H01M 8/0273 156/583.1
2020/0099071 A1* 3/2020 Kosai ............... H01M 8/04701

FOREIGN PATENT DOCUMENTS

| JP | 2007-113408 A | 5/2007 |
| JP | 2008-270045 A | 11/2008 |
| JP | 2012-169295 | * 9/2012 |
| JP | 2013-201039 A | 10/2013 |
| JP | 5587286 B2 | 9/2014 |
| JP | 2014-207229 A | 10/2014 |
| JP | 2020-047560 A | 3/2020 |

OTHER PUBLICATIONS

English translation of JP Publication 2012-169295, Sep. 2012.*
Office Action dated Dec. 13, 2022 issued over the corresponding Japanese Patent Application No. 2021-043363 with the English translation thereof.

* cited by examiner

*Primary Examiner* — Brittany L Raymond
(74) *Attorney, Agent, or Firm* — Carrier, Shende & Associates P.C.; Joseph P. Carrier; Jeffrey T. Gedeon (57) ABSTRACT

The method of manufacturing the fuel cell includes a step of stacking a gas diffusion layer (for example, an anode diffusion layer and a cathode diffusion layer) and a catalyst layer (for example, an anode catalyst layer and a cathode catalyst layer) on an electrolyte membrane, performing heat treatment with pressure and heat to form a membrane electrode assembly, a preliminary treatment step of bringing superheated steam into contact with the membrane electrode assembly, and an aging step of applying a voltage having a predetermined waveform between an anode electrode and a cathode electrode of the membrane electrode assembly subjected to the preliminary treatment step.

5 Claims, 7 Drawing Sheets

METHOD OF PRODUCING FUEL CELL

CROSS-REFERENCE TO RELATED APPLICATIONS

This application is based upon and claims the benefit of priority from Japanese Patent Application No. 2021-043363 filed on Mar. 17, 2021, the contents of which are incorporated herein by reference.

BACKGROUND OF THE INVENTION

Field of the Invention

The present invention relates to a method for manufacturing a fuel cell.

Description of the Related Art

In a manufacturing process of a fuel cell stack, a catalyst layer and a diffusion layer are bonded to both surfaces of an electrolyte membrane to form a membrane electrode assembly. Next, the membrane electrode assembly is sandwiched between a separator plate having an anode flow path and a separator plate having a cathode flow path to form a power generation cell. Furthermore, tens to hundreds of power generation cells are stacked. Then, the stacked power generation cells are sandwiched between a pair of end plates, and a tightening load is applied in the thickness direction to integrate the power generation cells. Through the above steps, a fuel cell stack is manufactured.

Thereafter, a process of activating the membrane electrode assembly in the fuel cell stack is performed. As the activation process, for example, a method (power generation aging method) has been proposed in which hydrogen gas is supplied to a fuel cell stack and power generation at a large current is repeatedly performed. A method of applying a voltage having a predetermined waveform pattern to a fuel cell stack while supplying a small amount of hydrogen gas (JP 5587286 B2) has also been proposed.

SUMMARY OF THE INVENTION

According to the activation method of JP 5587286 B2, there is an advantage that hydrogen consumption and processing time can be significantly reduced in comparison with a general power generation aging method. However, it has been found that the activation method disclosed in JP 5587286 B2 cannot provide a sufficient activation effect within an expected processing time for a membrane electrode assembly having different specifications in which a step of joining a catalyst layer and a diffusion layer to both surfaces of an electrolyte membrane is changed. That is, in the activation method of JP 5587286 B2, although the activation effect of the desorption and adsorption reaction of hydrogen at the anode electrode is excellent, the activation effect of the oxidation-reduction reaction at the cathode electrode may not be sufficient.

In order to obtain a desired activation effect, it is conceivable to perform a power generation aging method. However, there is a problem that a large amount of hydrogen gas is required.

Therefore, an object of the present invention is to provide a method of manufacturing a fuel cell capable of obtaining a sufficient activation effect in a short time while suppressing the consumption of hydrogen gas even when a manufacturing process of a membrane electrode assembly is changed.

According to an aspect of the present invention, there is provided a method of manufacturing a fuel cell, including: stacking a gas diffusion layer and a catalyst layer on an electrolyte membrane; performing heat treatment, with pressure and heat applied, to form a membrane electrode assembly; a pre-treatment step of bringing superheated steam into contact with the membrane electrode assembly; and an aging step of repeatedly applying a periodically varying voltage between an anode electrode and a cathode electrode of the membrane electrode assembly subjected to the pre-treatment.

The method of manufacturing a fuel cell according to the above aspect includes a preliminary treatment step of supplying superheated steam. Therefore, a barrier layer of the cathode electrode generated in the step of forming the membrane electrode assembly can be removed, and the discharge performance of the generated water of the gas diffusion layer of the cathode electrode is improved. As a result, the method of manufacturing a fuel cell according to the above-described aspect can eliminate the inhibition of diffusion of oxygen to the catalyst layer on the cathode electrode side, and exhibits a sufficient activation effect for the oxidation-reduction reaction of the cathode electrode.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Steps of a method for manufacturing a fuel cell of the present embodiment proceed in the order of FIGS. 1 to 7. First, a process of forming a membrane electrode assembly 12 shown in FIGS. 1 to 3 will be described.

Figure 1:
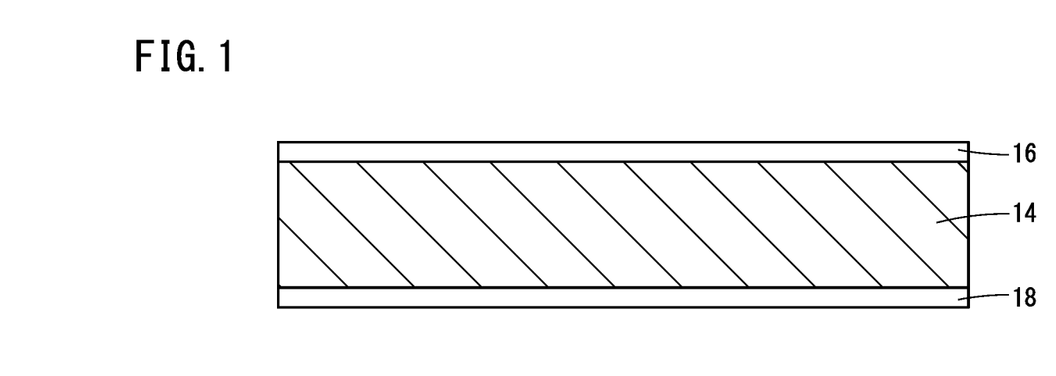
FIG. 1 is a cross-sectional view illustrating a step of forming a catalyst on an electrolyte membrane according to an embodiment.

As shown in FIG. 1, in the first step, an anode catalyst layer 16 is formed on one surface of an electrolyte membrane 14, and a cathode catalyst layer 18 is formed on the other surface of the electrolyte membrane 14. The electrolyte membrane 14 is formed of, for example, a solid polymer electrolyte such as a fluorine-based resin having hydrogen conductivity. The electrolyte membrane 14 is provided as a sheet body wound in a roll shape. The roll-shaped electrolyte membrane 14 is stretched. Ink containing an anode catalyst is applied to one surface of the electrolyte membrane 14. Ink containing a cathode catalyst is applied to the other surface of the electrolyte membrane 14. The electrolyte membrane 14 coated with the ink containing the catalyst is heated at a predetermined temperature in a heating furnace to form the anode catalyst layer 16 and the cathode catalyst layer 18. The ink containing the anode catalyst and the ink containing the cathode catalyst contain at least a proton conductive resin (electrolyte component) in addition to carbon particles (catalyst particles) supporting a metal catalyst. In a subsequent step, the electrolyte membrane 14 on which the anode catalyst layer 16 and the cathode catalyst layer 18 are formed is wound into a roll shape.

Figure 2:
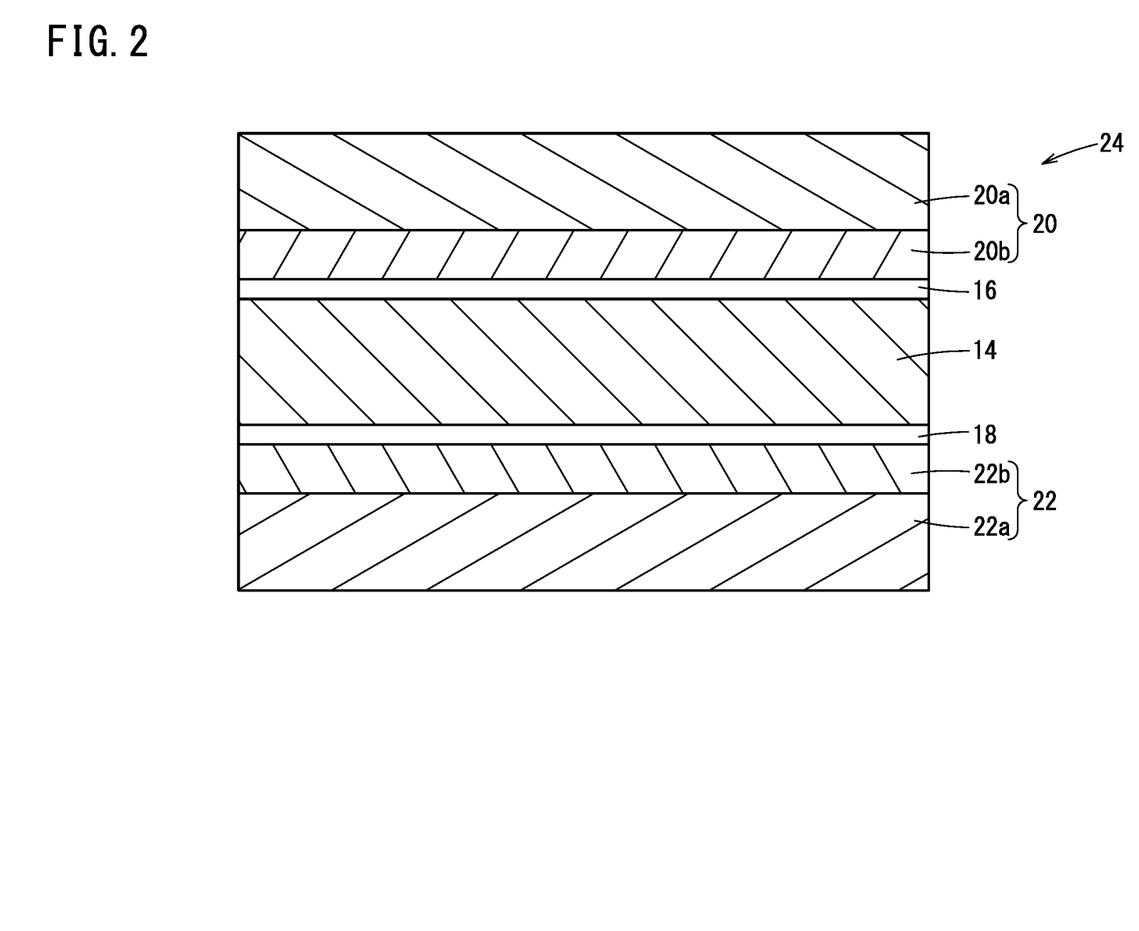
FIG. 2 is a cross-sectional view illustrating a process of stacking an anode diffusion layer and a cathode diffusion layer on the electrolyte membrane of FIG. 1.

Next, in a step shown in FIG. 2, the electrolyte membrane 14 is stretched into a sheet shape. In a subsequent step, an anode diffusion layer 20 is stacked on the anode catalyst layer 16, and a cathode diffusion layer 22 is stacked on the cathode catalyst layer 18. After a fluorine-based water repellent agent is fixed on a main diffusion layer 20a made up from a porous sheet such as carbon paper, a microporous layer 20b is applied and is subjected to heat treatment to form the anode diffusion layer 20. The microporous layer 20b is a layer having pores with diameters smaller than those of the main diffusion layer 20a. The anode diffusion layer 20 is stacked on the anode catalyst layer 16 so that the microporous layer 20b is adjacent to the anode catalyst layer 16.

The cathode diffusion layer 22 is formed in the same manner as the anode diffusion layer 20. That is, the water repellent agent is fixed to the surfaces of a main diffusion layers 22a formed of a porous-sheet such as carbon paper. Then, a microporous layer 22b is coated on the main diffusion layer 22a and is subjected to heat treatment to form the cathode diffusion layer 22. The microporous layer 22b of the cathode diffusion layer 22 may be formed of a plurality of layers having different pore diameters. The cathode diffusion layer 22 is stacked on the electrolyte membrane 14 such that the microporous layer 22b is adjacent to the cathode catalyst layer 18.

Through the above steps, a stacked structure 24 shown in FIG. 2 is completed. The order of stacking the anode diffusion layer 20 and the cathode diffusion layer 22 is not limited to the above-described order. Stacking of the cathode diffusion layer 22 may be performed before stacking of the anode diffusion layer 20, or both may be simultaneously stacked. Thereafter, the sheet-like stacked structure 24 having the cross-sectional structure shown in FIG. 2 is cut into a predetermined rectangular shape having a predetermined dimension corresponding to the dimension of a fuel cell.

Figure 3:
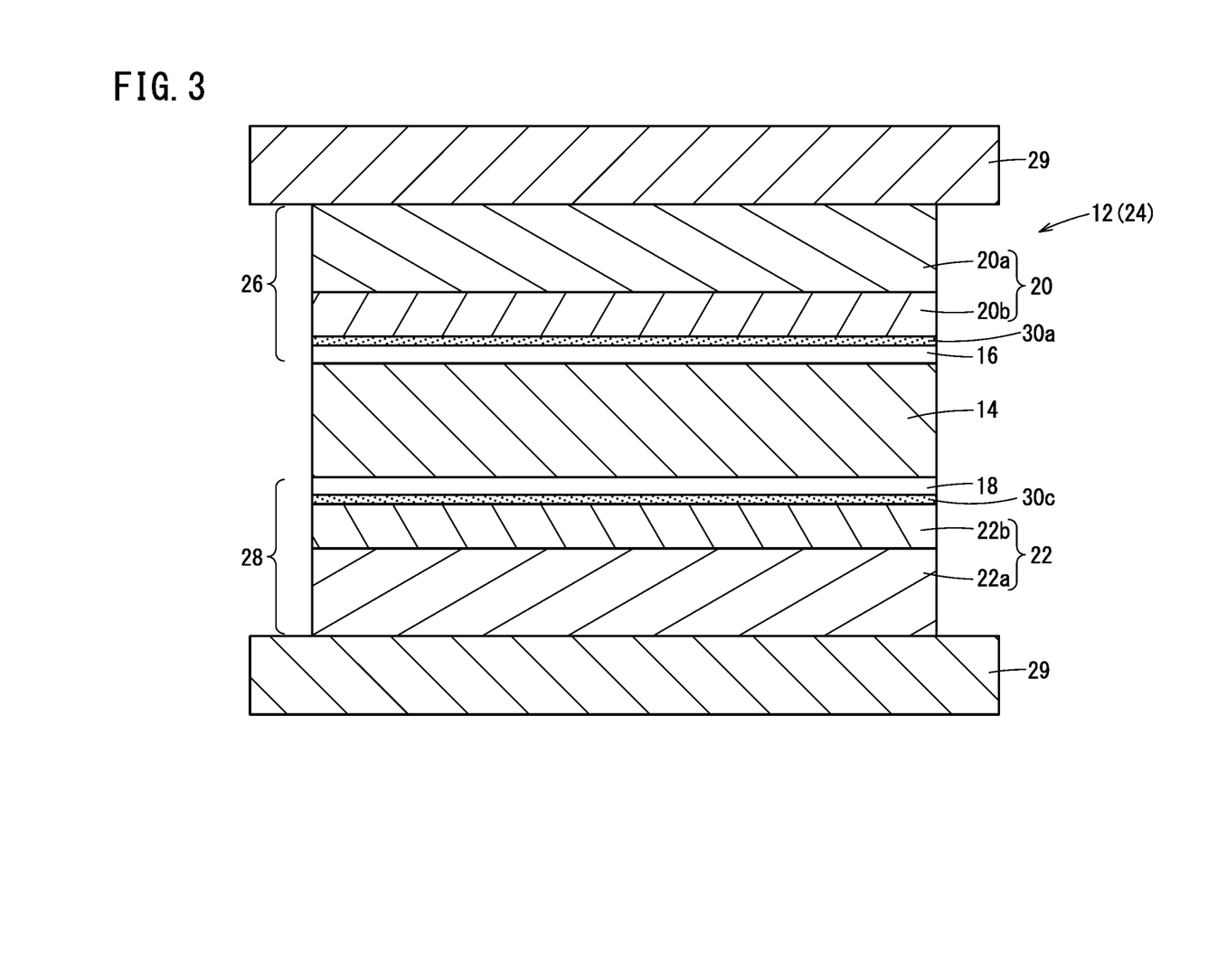
FIG. 3 is a cross-sectional view showing a step of forming a membrane electrode assembly by integrating the multi-layer structure of FIG. 2.

Next, as shown in FIG. 3, the stacked structure 24 is heated while being pressurized using a pressurizing device 29. As a result, the anode diffusion layer 20 and the cathode diffusion layer 22 are integrated with the electrolyte membrane 14 to form the membrane electrode assembly 12. In this step, the joining strength between the electrolyte membrane 14 and the anode catalyst layer 16 and the joining strength between the electrolyte membrane 14 and the cathode catalyst layer 18 are increased. That is, the electrolyte component contained in the anode catalyst layer 16 penetrates into the voids of the anode diffusion layer 20. Further, the electrolyte component contained in the cathode catalyst layer 18 permeates into the voids of the cathode diffusion layer 22. The electrolyte component having permeated acts like an adhesive. As a result, the anode diffusion layer 20 and the cathode diffusion layer 22 are firmly bonded to and integrated with the electrolyte membrane 14. As a result, an anode electrode 26 in which the anode catalyst layer 16 and the anode diffusion layer 20 are stacked sequentially is formed on one surface of the electrolyte membrane 14. Further, a cathode electrode 28 in which the cathode catalyst layer 18 and the cathode diffusion layer 22 are stacked sequentially is formed on the other surface of the electrolyte membrane 14, and the electrolyte membrane electrode assembly 12 is completed.

In the membrane electrode assembly 12 formed by the steps described above, a joining interface layer 30a containing a large amount of solid electrolytes is formed near the interface between the anode catalyst layer 16 and the microporous layer 20b of the anode diffusion layer 20. A joining interface layer 30c containing a large amount of solid electrolytes is formed near the interface between the cathode catalyst layer 18 and the microporous layer 22b of the cathode diffusion layer 22. As described above, according to the present embodiment, the joining interface layer 30a (barrier layer) that prevents movement of substance is more likely to be formed at the interface between the microporous layer 20b and the anode catalyst layer 16, compared to the case where the anode catalyst layer 16 is formed on the microporous layer 20b of the anode diffusion layer 20 and then bonded to the electrolyte membrane 14. The joining interface layer 30c is also formed as a barrier layer at the interface of the cathode catalyst layer 18.

Figure 4:
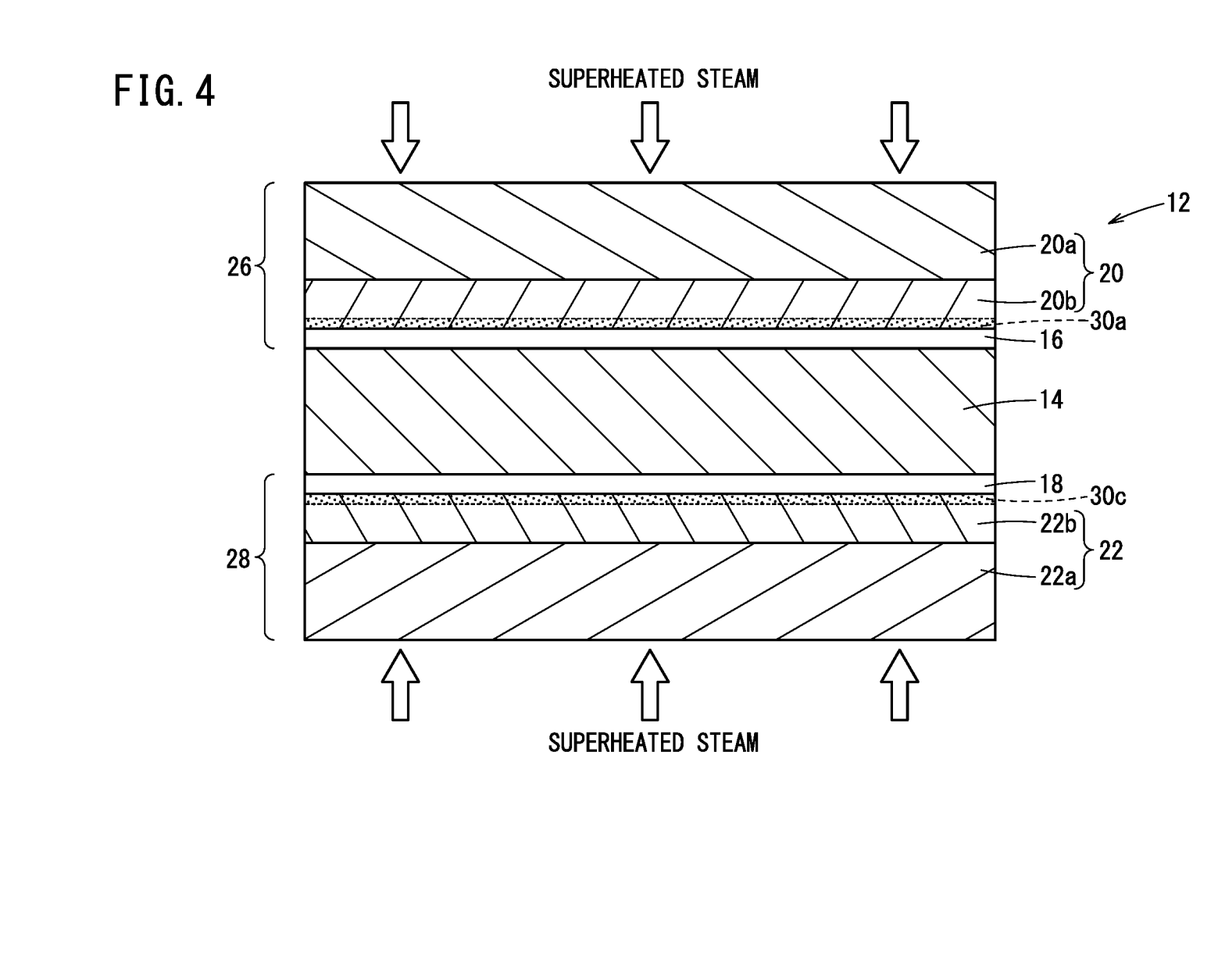
FIG. 4 is a cross-sectional view showing a step of supplying superheated steam to both surfaces of the membrane electrode assembly of FIG. 3.

Therefore, in the present embodiment, as shown in FIG. 4, a preliminary treatment step of supplying superheated steam to the membrane electrode assembly 12 is performed. In the pretreatment step, superheated steam is supplied to the anode electrode 26 and the cathode electrode 28 of the membrane electrode assembly 12. The superheated steam is supplied in a pressurized and heated state. Further, superheated steam is emitted and supplied to spray the anode electrode 26 and the cathode electrode 28 as fluid made of only $H_2O$ molecules.

In the heat treatment using superheated steam, the arrangement of a superheated steam injection nozzle (not shown) and the membrane electrode assembly 12 is devised. Therefore, the heat treatment can be performed in a low-oxygen or oxygen-free state without gas replacement. Specifically, the membrane electrode assembly 12 is covered with a cover (not shown) that prevents inflow of atmospheric air (oxygen) from the surroundings. Superheated steam is supplied from the injection nozzle while adjusting the pressure in the cover to be higher than the ambient (atmospheric) pressure. Thus, the heat treatment can be performed in a low-oxygen or oxygen-free state even without gas replacement.

Superheated steam has excellent heat transfer properties and can be heat-treated in an oxygen-free state. Further, gas pressure acts when superheated steam is injected so as to spray the anode electrode 26 and the cathode electrode 28. Thus, the heat treatment can be performed without oxidizing the catalyst particles. When superheated steam is supplied to the joining interface layers 30a and 30c, moisture of the superheated steam swells the particles of the solid electrolytes and increases the fluidity of the solid electrolytes. Then, the joining interface layers 30a and 30c made up from the solid electrolytes with increased fluidity are pushed and spread to the periphery by the jet flow of the superheated steam.

As a result, the porosity of the joining interface layers 30a and 30c increases. That is, in the joining interface layer 30a between the anode diffusion layer 20 and the anode catalyst layer 16, the number of voids through which substance (hydrogen gas or moisture) can flow is increased, and the hydrogen-diffusing property between the anode diffusion layer 20 and the anode catalyst layer 16 is improved. Further, in the joining interface layer 30c between the cathode diffusion layer 22 and the cathode catalyst layer 18, the number of voids through which substance (oxygen gas or moisture) can flow is increased, and the oxygen-diffusing property between the cathode diffusion layer 22 and the cathode catalyst layer 18 is improved.

Figure 5:
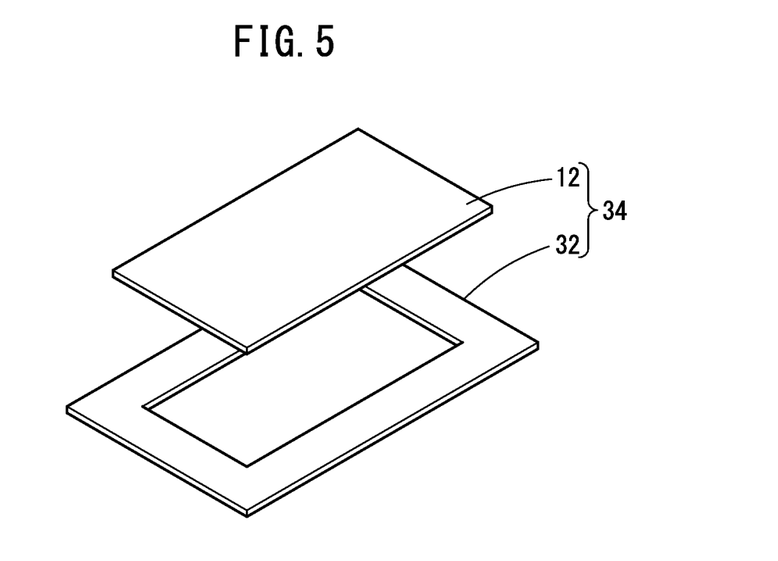
FIG. 5 is an explanatory view showing a step of joining a frame member to the membrane electrode assembly of FIG. 4.

Next, as shown in FIG. 5, after the preliminary treatment step, a frame member 32 is joined to the membrane electrode assembly 12. The frame member 32 is made up from resin, for example, and is formed so as to surround the outer peripheral portion of the membrane electrode assembly 12. The frame member 32 is joined to the vicinity of the outer peripheral end of the membrane electrode assembly 12. Through the above steps, the framed membrane electrode assembly 34 is completed.

Figure 6:
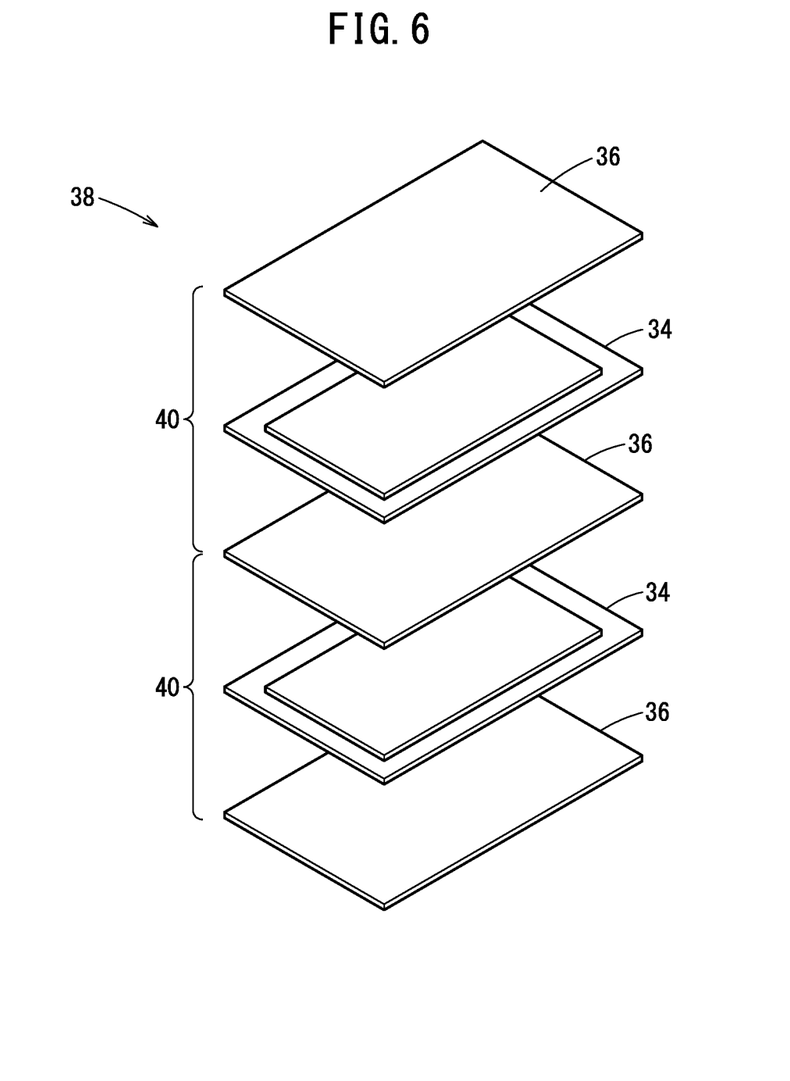
FIG. 6 is an explanatory view showing a step of forming a fuel cell stack by stacking framed membrane electrode assemblies and separators.
Figure 7:
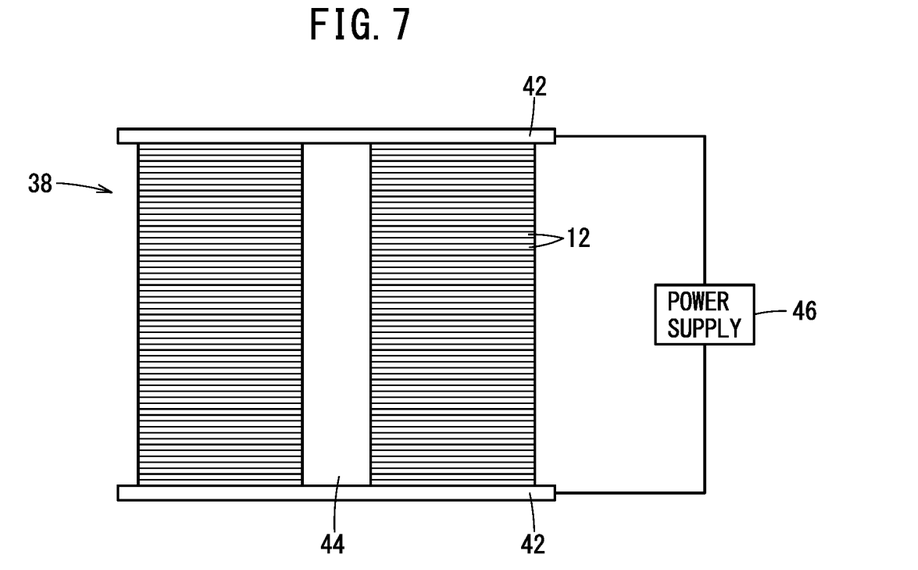
FIG. 7 is an explanatory diagram showing a step of applying a voltage having a predetermined waveform to the fuel cell stack to perform aging.

Next, as shown in FIG. 6, an assembly step is performed in which a plurality of framed membrane electrode assemblies 34 and a plurality of separators 36 are alternately stacked to assemble a fuel cell stack 38. One power generation cell 40 is formed by sandwiching the framed membrane electrode assembly 34 between the separators 36 on both sides in the thickness direction. Tens to hundreds of the power generation cells 40 are stacked. Further, as shown in FIG. 7, a current collector plate, an insulator plate (insulating plate), and an end plate 42, which are not shown, are disposed on each of both ends of the stacked body formed by a plurality of power generation cells 40 in this order from the inside. Then, the fastening means 44 is bridged between the end plates 42 at both ends, and the fastening means 44 applies a fastening load to the stacked body of the power generation cells 40. Thus, the assembly of the fuel cell stack 38 is completed.

Thereafter, as shown in FIG. 7, an aging process is performed on the fuel cell stack 38. The aging process includes a step of applying a voltage having a predetermined waveform supplied from a power supply device 46 to the fuel cell stack 38 while supplying a small amount of hydrogen gas to the plurality of anode electrodes 26. For example, an activation method described in JP 5587286 B2 can be performed. As a result, the anode catalyst layer 16 and the cathode catalyst layer 18 are activated, and the power generation performance is improved.

Through the above-described steps, the method for manufacturing a fuel cell according to this embodiment is completed. The method of manufacturing a fuel cell according to this embodiment has the following effects.

The method of manufacturing a fuel cell according to the present embodiment includes the a step of stacking gas diffusion layers (e.g., anode diffusion layer 20 and cathode diffusion layer 22) and catalyst layers (e.g., anode catalyst layer 16 and cathode catalyst layer 18) on the electrolyte membrane 14, and performing heat treatment, with pressure and heat applied, to form the membrane electrode assembly 12, a pre-treatment step of bringing superheated steam into contact with the membrane electrode assembly 12, and an aging step of applying a voltage having a predetermined waveform between the anode electrode 26 and the cathode electrode 28 of the membrane electrode assembly 12 subjected to the pre-treatment step.

According to the above-described method of manufacturing the fuel cell, by performing the preliminary treatment step of supplying superheated steam, an aging effect comparable to that of the power generation aging method of generating a large current while consuming a large amount of hydrogen gas can be obtained.

In the above method of manufacturing the fuel cell, the preliminary treatment step is performed by supplying superheated steam to both the anode electrode 26 side and the cathode electrode 28 side of the membrane electrode assembly 12. This can improve the diffusion properties of the joining interface layer 30a between the anode catalyst layer 16 and the anode diffusion layer 20 and the joining interface layer 30c between the cathode catalyst layer 18 and the cathode diffusion layer 22.

In the above-described method of manufacturing the fuel cell, the preliminary treatment step may be performed by injecting a jet flow of superheated steam onto the surface of the membrane electrode assembly 12. In addition to the swelling property of the superheated steam, the gas pressure due to the jet flow acts, whereby the diffusion properties of the joining interface layers 30a and 30c can be improved more effectively.

In the above method of manufacturing the fuel cell, the preliminary treatment step may be performed in an oxygen-free atmosphere. According to this method, oxidation of the catalyst surface can be prevented.

The above-described method of manufacturing the fuel cell may further include a step of joining the separators 36 to both surfaces of the membrane electrode assembly 12 subjected to the preliminary treatment step to form the power generation cells 40 and a stacking step of stacking a plurality of the power generation cells 40 to form the fuel cell stack 38, and the aging step may be performed after the stacking step. According to this configuration, a stable aging effect can be obtained regardless of the manufacturing process of the membrane electrode assembly 12.

In the foregoing, the present invention has been described with reference to preferred embodiments. The present invention is not limited to the above-described embodiment, and various modifications can be made without departing from the spirit of the present invention.

What is claimed is:

1. A method of manufacturing a fuel cell comprising:
a first step of stacking a gas diffusion layer and a catalyst layer on an electrolyte membrane and performing heat treatment using a pressurizing device, with pressure and heat applied, to form a membrane electrode assembly including a joining interface layer formed between the gas diffusion layer and the catalyst layer, the joining interface layer containing a solid electrolyte;
a preliminary treatment step of bringing superheated steam into contact with the membrane electrode assembly formed in the first step; and
an aging step of applying a voltage having a predetermined waveform between an anode electrode and a cathode electrode of the membrane electrode assembly subjected to the preliminary treatment step,
wherein in the preliminary treatment step, a jet flow of the superheated steam is injected onto a surface of the membrane electrode assembly thereby increasing porosity of the joining interface layer without pressing the membrane electrode assembly.

2. The method according to claim 1, wherein in the preliminary treatment step, the superheated steam is supplied to both the anode electrode and the cathode electrode of the membrane electrode assembly.

3. The method according to claim 1, wherein the preliminary treatment step is performed in an oxygen-free atmosphere.

4. The method according to claim 1, further comprising:
joining separators to both surfaces of the membrane electrode assembly subjected to the preliminary treatment step to form a power generation cell; and
stacking a plurality of power generation cells to form a fuel cell stack,
wherein the aging step is performed after the stacking of the plurality of power generation cells.

5. A method of manufacturing a fuel cell comprising:
a catalyst layer forming step of applying ink containing an anode catalyst to one surface of an electrolyte membrane, and applying ink containing a cathode catalyst to another surface of the electrolyte membrane, and then firing the electrolyte membrane to form an anode catalyst layer and a cathode catalyst layer on the electrolyte membrane;
an anode diffusion layer stacking step of stacking an anode diffusion layer on the anode catalyst layer;
a cathode diffusion layer stacking step of stacking a cathode diffusion layer on the cathode catalyst layer;
a membrane electrode assembly forming step of forming a membrane electrode assembly by pressing and heating, using a pressurizing device, a stacked structure formed of the anode diffusion layer, the anode catalyst layer, the electrolyte membrane, the cathode catalyst layer, the cathode diffusion layer, to form the membrane electrode assembly including a joining interface layer formed between the gas diffusion layer and the catalyst layer, the joining interface layer containing a solid electrolyte;
a preliminary treatment step of bringing superheated steam into contact with the membrane electrode assembly thereby increasing porosity of the joining interface layer without pressing the membrane electrode assembly; and
an aging step of applying a voltage having a predetermined waveform between an anode electrode and a cathode electrode of the membrane electrode assembly subjected to the preliminary treatment step.

* * * * *